United States Patent [19]

Dawson et al.

[11] Patent Number: 5,735,349
[45] Date of Patent: Apr. 7, 1998

[54] COMPOSITIONS AND METHODS FOR MODIFYING THE PERMEABILITY OF SUBTERRANEAN FORMATIONS

[75] Inventors: Jeffrey C. Dawson, Spring; Hoang Le, Houston; Subramanian Kesavan, The Woodlands, all of Tex.

[73] Assignee: BJ Services Company, Tomball, Tex.

[21] Appl. No.: 689,969

[22] Filed: Aug. 16, 1996

[51] Int. Cl.$^6$ ........................................ E21B 33/138
[52] U.S. Cl. ........................... 166/295; 166/294; 507/222; 507/225; 523/130
[58] Field of Search ............................. 166/294, 295; 405/264; 507/222, 225, 227, 903; 523/130, 131, 132

[56] References Cited

U.S. PATENT DOCUMENTS

| | | | |
|---|---|---|---|
| 3,302,717 | 2/1967 | West et al. | 166/295 X |
| 3,380,529 | 4/1968 | Hendrickson | 166/295 |
| 3,730,271 | 5/1973 | Gall | 166/294 |
| 3,826,311 | 7/1974 | Szabo et al. | 166/295 |
| 3,893,510 | 7/1975 | Elphingstone et al. | 166/295 |
| 4,282,928 | 8/1981 | McDonald et al. | 166/295 X |
| 4,328,864 | 5/1982 | Friedman | 166/295 X |
| 4,330,450 | 5/1982 | Lipowski et al. | 166/295 X |
| 4,572,295 | 2/1986 | Walley | 166/295 |
| 5,048,607 | 9/1991 | Phelps et al. | 166/295 X |
| 5,111,886 | 5/1992 | Dovan et al. | 166/300 |
| 5,125,456 | 6/1992 | Hutchins et al. | 166/295 |
| 5,145,012 | 9/1992 | Hutchins et al. | 166/292 |
| 5,161,615 | 11/1992 | Hutchins et al. | 166/295 |
| 5,203,834 | 4/1993 | Hutchins et al. | 166/270 |
| 5,207,934 | 5/1993 | Dovan et al. | |
| 5,211,858 | 5/1993 | Dovan et al. | |
| 5,213,446 | 5/1993 | Dovan | 405/128 |
| 5,225,090 | 7/1993 | Hutchins et al. | |
| 5,226,480 | 7/1993 | Dovan et al. | 166/300 |
| 5,244,042 | 9/1993 | Dovan et al. | 166/270 |
| 5,246,073 | 9/1993 | Sandiford et al. | 166/295 |
| 5,263,540 | 11/1993 | Dovan et al. | 166/278 |
| 5,268,112 | 12/1993 | Hutchins et al. | |
| 5,291,949 | 3/1994 | Dovan et al. | 166/295 |
| 5,335,733 | 8/1994 | Sandiford et al. | 166/300 |
| 5,418,217 | 5/1995 | Hutchins et al. | 507/222 |
| 5,465,792 | 11/1995 | Dawson et al. | 166/295 |
| 5,486,312 | 1/1996 | Sandiford et al. | |

*Primary Examiner*—George A. Suchfield
*Attorney, Agent, or Firm*—Arnold, White & Durkee

[57] ABSTRACT

Compositions and methods for modifying the permeability of subterranean formations are shown. The compositions and methods generally comprise forming a dispersion of water swellable crosslinked polymer particles, adding the dispersion to a carrier fluid to form a treatment fluid, and injecting the treatment fluid into the subterranean formation. The particles are made by polymer emulsion or microemulsion processes, resulting in particles that are much smaller in size than that of the formation pore strictures. Upon injection, the particles become trapped in the formation, and upon flowback of water, the particles swell in size and adsorb onto the formation, forming a film and restricting further fluid flow.

10 Claims, No Drawings

COMPOSITIONS AND METHODS FOR MODIFYING THE PERMEABILITY OF SUBTERRANEAN FORMATIONS

FIELD OF THE INVENTION

The present invention provides compositions and methods for modifying the permeability of subterranean formations. The compositions and methods comprise injecting a dispersion of water swellable crosslinked polymer particles which are of much smaller size than that of the formation pores to affect the permeability of the formation. Methods of making the compositions of the present invention are also provided.

BACKGROUND OF THE INVENTION

The pressure exerted on most hydrocarbon producing reservoirs is due, in part, to either edge or bottom water drives. The wells used to capture these hydrocarbon reserves are initially completed in the hydrocarbon rich intervals. Eventually, these reserves will become partially depleted as the well matures. The produced hydrocarbons will steadily decline while the percentage of water in the produced fluid tends to increase dramatically.

The water generally enters the wellbore from either the lower portion of the producing interval or through high permeable streaks running through the formation. These streaks are often in communication with the water rich portions of the reservoir. The continual increase in the water fraction of the produced fluids results in the loss of water pressure that was previously exerted on the hydrocarbon fluids. That effect contributes to accelerated declines in hydrocarbon production. In addition, the produced water, normally a brine, must be safely disposed of, causing an additional expense for the well's operator.

Several approaches have been used to rectify this problem. The early approach was to sequentially treat the formation with a sodium silicate solution followed by a calcium ion rich solution. Mixing of these solutions within the formation produced a viscous calcium silicate gel which inhibited water flow through the formation's porous network. Another approach was to inject phenol and formaldehyde together in a selected zone, ultimately forming an insoluble resin. By regulating the pH and component concentration, the reaction kinetics became manageable enough to compensate for reservoir temperature. Although inexpensive, this process was susceptible to failure due to contamination.

Polyacrylamide gels crosslinked with chromium (+3) ions have also become popular. The polyacrylamide can be either a homopolymer or terpolymer. The crosslinking reactions are slow enough that the fluid can be easily placed in the reservoir before gelation occurs. The resulting viscous gel blocks or prevents farther fluid flow through the highly permeable porous network or micro fractures in the matrix.

In each of these approaches, the chemicals are not selective and can damage both water and hydrocarbon production pathways. The damage to the hydrocarbon channels is undesirable since it will reduce the well's productivity and profitability. Also the prior art processes were extremely sensitive to the component concentrations. Recently, a new approach has been developed to overcome these disadvantages.

SUMMARY OF THE INVENTION

In this invention, methods and compositions for modifying the permeability of subterranean formations are provided. The invention generally includes forming a dispersion of water swellable crosslinked polymer particles, adding the dispersion to a carrier fluid to form a treatment fluid, and injecting the treatment fluid into the subterranean formation. The particles are much smaller in size than that of the formation pore strictures, and upon injection, become trapped in the formation. Upon contact with water, the polymer particles swell in size, adsorb onto the formation, and restrict further water flow.

With the present invention, there is an interaction with the water in water rich levels, whereas in hydrocarbon intervals, the composition remains essentially inert. The product performance is selective in that it responds differently to differing reservoir fluids. The particles retained in the hydrocarbon rich zones remain unchanged and generally do not inhibit flow.

DETAILED DESCRIPTION

In the present invention, new methods and compositions are provided for modifying the permeability of subterranean formations. The compositions of the present invention comprise a vinylamide monomer, a monomer containing ammonium or quaternary ammonium moieties, and a crosslinking monomer. The compositions further comprise a monomer selected from vinylcarboxylic acids or salts of those acids or vinylsulfonic acids or salts of those acids. Methods for modifying the permeability of a subterranean formation are also provided, and comprise forming a dispersion of water swellable crosslinked polymer particles comprising the compositions of the invention, adding an inverting surfactant to the dispersion, adding the dispersion to a carrier fluid to form a treatment fluid, and injecting the treatment fluid into at least a portion of the subterranean formation. The polymer particles are made by invert polymer emulsion or microemulsion processes, and, thus, they are much smaller in size than that of the formation pore strictures. During injection into the well, the polymer particles become trapped in the formation. Later, during flow back, water invades the treated portion of the formation, and upon contact with the water, the polymer particles swell many times their initial size. The degree of swelling may be controlled by salt content or by adjusting the pH. Because of the aqueous nature of the treatment fluid, it generally moves to areas in the subterranean formation having high water saturation.

The particles, which are amphoteric, adsorb onto formation material, forming a film the thickness of the particle diameter. Amphoteric polymers, those containing both cationic and anionic charges, are known to adsorb onto formation material and form a film. Being very hydrophilic, the polymer film tends to strongly attract formation water and may cause some of the formation water to become immobilized. The water increases the tendency of polymer film swelling, and the continued swelling also increases the polymer film's size. The polymer film's attraction to water may also cause further flow impairment due to drag forces exerted on the water flowing through the pore stricture matrix. Ultimately, although drag forces are not strong enough to completely stop water flow, the particles bridge at pore strictures and restrict further fluid flow, impairing water production.

In oil rich areas, the polymer particles will adsorb and fill onto subterranean formation material, although the polymer particles, which are hydrophilic, will not attract oil. Because of this lack of fluid interaction, the polymer fill will remain shrunken, and the impairment of hydrocarbon production will be minimized. This behavior allows the well operator to place the composition without the need of zone isolation or the fear of impairing hydrocarbon production.

Most commercially available "super absorber" polymer particles are too big, ranging in size from about 10 µm to 100 µm, and tend to filter out in the rear well bore area. These commercially available "super absorbers" are made by suspension processes. In those processes, monomers are added to a solvent such as t-butanol. As the polymerization proceeds, the polymer molecular weight increases and the solvent's ability to maintain solubility diminishes until the polymer finally precipitates from solution. This process provides particles that are too big to flow through the pore strictures of a reservoir. Even with grinding, the particles remain too big to be effective. Consequently, they will screen off at the formation surface.

In the present invention, the problem of excessive size constraint is overcome by making the polymer particles by the invert polymer emulsion process. Using this process, polymer particles that are "super absorber-like," yet small enough to flow through reservoir pore strictures, can be made. Preferably, the particle size ranges between 0.05 µm and 1 µm.

In making the polymer dispersion of the present invention, various hydrophilic monomers are used. In this disclosure, the term "monomer" refers to those molecules or compounds that are capable of forming a polymer upon combination with other like or similar molecules or compounds. The hydrophilic monomers may include both ionic and nonionic monomers. In one embodiment, the polymer dispersion is prepared as an emulsion or microemulsion that comprises an aqueous phase and a hydrocarbon phase. Emulsion polymerization techniques are well known to those skilled in the art. Emulsion polymerization techniques are disclosed in *Emulsion Polymers and Emulsion Polymerization*, American Chemical Society (ACS) Symposium Series 165 (1981), which is incorporated herein by reference. The emulsion is formed when a hydrocarbon solvent (the hydrocarbon phase) is slowly poured into the rapidly stirred monomer solution (the aqueous phase), and the mixture is allowed to homogenize. After degassing and addition of a catalyst or an initiator, the monomers begin to chemically bond to one another and form high molecular weight polymers, forming a dispersion of solids or polymer particles dispersed in a liquid phase. Throughout this application, the terms emulsion and dispersion may be used interchangeably.

In all embodiments of the present invention, the aqueous phase of the polymer dispersion comprises a monomer solution of two or more monomers. Preferably, an anionic monomer such as acrylamide and a cationic monomer are used. The monomer solution is mixed with a hydrocarbon solvent through emulsion techniques to form a dispersion. The polymer dispersion is then inverted in water at the well site prior to injection into the wellbore and ultimately in the formation. In a preferred embodiment, the aqueous phase further comprises a crosslinking monomer, so that the polymer chains formed within the emulsion's micelles are crosslinked during polymerization. Typically, the overall polymer content may range from 0.08 to 15.0% polymer weight to solution weight. Preferably, the polymer dispersion comprises 0.1 to 1.5% polymer weight. The specific polymer content is dependent on the pore stricture dimensions and the formation composition.

The aqueous phase or monomer solution of the present invention typically comprises two or more monomers. The monomers are mixed together in an aqueous solution so that the monomer content ranges between 40 and 70% by weight. The pH of the solution may be neutralized by the slow addition of aqueous sodium hydroxide. In a preferred embodiment, the monomer solution has three components comprising a vinylamide monomer, a monomer containing ammonium or quaternary ammonium moieties, and a crosslinking monomer. Preferably, the monomer solution contains 0 to 5 parts vinylamide monomer of the formula:

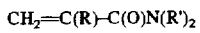

$$CH_2=C(R)-C(O)N(R')_2$$

where R represents a hydrogen atom or methyl, ethyl or propyl moiety and R' represents a hydrogen atom or methyl, ethyl or propyl moiety. The vinylamide monomer can also be a vinyllactam such as vinylpyrolidone. Other examples of vinylamide monomers include acrylamide, methacrylamide, and N,N-dimethylacrylamide. Preferably, the vinylamide monomer comprises acrylamide.

The monomer containing ammonium or quaternary ammonium moieties typically ranges from 0.5 to 5 parts and preferably comprises dimethyldiallyl ammonium chloride. The chloride counter ion can also be substituted with any other halogen, sulfate, or phosphate. Other examples include dimethyldiallyl ammonium sulfate, methacrylamido propyl trimethyl ammonium bromide, and methacrylmaido propyl trimethyl ammonium chloride monomers.

In a preferred embodiment the monomer solution further comprises an amount of about 50 to 1000 ppm crosslinking monomer. Crosslinking monomers are described in U.S. Pat. No. 5,465,792, which is incorporated herein by reference. The preferred crosslinking monomers are methylene bisacrylamide, dialylamine, N,N-diallylacrylamide, divinyloxyethane and divinyldiemthylsilane. The most preferred crosslinking monomer is methylene bisacrylamide.

In another preferred embodiment, an additional monomer may be used, ranging from 0 to 5 parts and selected from vinyl carboxylic acids or salts of those acids or vinylsulfonic acids or salts of those acids having the general formula shown below:

$$CH_2=CHC(O)X$$

where X represents moieties containing either a carboxylic acid or salt of that acid or a moiety containing a sulfuric acid or sulfonic acid or salts of those acids. Examples include acrylic acid, acrylamidomethylpropane sulfonic acid, itaconic acid, maleic acid, methacrylic acid, styrene sulfonic acid and vinyl sulfonic acid or the esters or salts of these acids. These salts include ammonium, alkali metal or alkaline earth metal salts. The use of this additional monomer is preferred but not essential to the present invention.

In yet another embodiment, the aqueous phase further comprises an emulsifying surfactant. These surfactants are usually nonionic with hydrophilic lipophilic balance (HLB) values of the surfactant system ranging from about 3 to 10. The preferred HLB is between 4 and 6. The surfactant HLB values are low to form water-in-oil emulsions. The surfactants are generally added at 0.5 to 2% by weight of the emulsion and include ICI's SPAN® surfactants and Rhone Poulenc's IGEPAL® surfactants. The surfactants, having low HLB values, are usually oil soluble, and alternatively may be added to the hydrocarbon solvent in the hydrocarbon phase.

The hydrocarbon phase of the polymer dispersion comprises a hydrocarbon solvent. Preferred hydrocarbon solvents are high boiling aliphatic refined oils such as Exxon's NORPAR® and ISOPAR® solvents. Typically, the solvent ranges from about 20% to 50% by weight of the emulsion.

Once the emulsion is formed by mixing the aqueous and hydrocarbon phases, the emulsion is then degassed and polymerization is initiated with the addition of a catalyst or an initiator. In a preferred embodiment, the catalyst comprises low dosages of peroxides such as cumene hydroperoxide in NORPAR® 12. Preferably, the polymerization is initiated by adding 1 ml of 2% by weight cumene hydroperoxide. Other catalysts suitable for the present invention include sodium persulfate, ammonium persulfate and t-butyl hydroperoxide. A co-catalyst such as thionyl chloride in NORPAR® 12 or sodium sulfite solution may also be used. Because of the exothermic nature of the reaction initiated by the addition of the catalyst, evidence of the reaction is indicated by an increase in the temperature of the emulsion. Preferably, the temperature of the reacting emulsion should not exceed about 40° C. in order to promote chain initiation and propagation while minimizing chain termination, although gradual temperature increases of the reacting emulsion are acceptable.

In another embodiment, the emulsion can be further treated with inverting surfactants after polymerization is complete. Suitable inverters include 10 mole nonylphenol ethoxylates or $C_{9-18}$ dialkanolquatenary ammonium chlorides at concentrations less than 5% by weight based on the emulsion. The preferred inverting surfactant is 10 mol nonylphenol ethoxylate. These surfactants promote easy inversion of the emulsions at the subterranean formation or well site.

In the treatment of oil and gas wells, the polymer dispersion must first be added to the carrier fluid to form a treatment fluid. Typically, the polymer dispersion content may range from 0.1 to 20% by weight. Preferably, the polymer dispersion content may range from 1 to 5% by weight. To minimize swelling of the polymer particles, the carrier fluid should be saline. Typically, the carrier fluid should have salt at concentrations of 0.1% to saturated. Preferably, the carrier fluid comprises a 2% (wt./vol) potassium chloride solution. The pH can be adjusted from 9.0 to a range between 3.0 and 5.0. The amount of salt and the pH used are dependent on the size of the pore network as determined from the permeability of the formation. The smaller the pores, the stronger the saline solution and the lower the pH. The polymer concentration is also dependent on the pore size.

In another embodiment of the present invention, a method for modifying the permeability of a subterranean formation is provided, and comprises forming a polymer dispersion of the present invention, adding an inverting surfactant, and adding the polymer dispersion to a carrier fluid such as a salt solution, so that the polymer particles are dispersed throughout, to form a treatment fluid. The treatment fluid is then injected into the formation.

The treatment fluid may comprise a salt solution, the polymer emulsion, water, and pH adjusting buffer. In a preferred embodiment, the carrier fluid comprises a 1% to 5% (wt./vol.) aqueous potassium chloride solution. Preferably, the carrier fluid comprises a 2% (wt./vol.) potassium chloride solution. Typically, an mount of 0.1% to 20% of the polymer emulsion may be added to the carrier fluid. Preferably, an amount 1% to 5% (vol./vol.) of the polymer emulsion is added to the carrier fluid. An inverting surfactant is also added. In a preferred embodiment 0.5% (vol./vol.) inverting surfactant is added.

The treatment fluid may be prepared at the well site. The treatment fluid can be batch prepared or prepared by continuous mix processes. In one embodiment, the treatment fluid is prepared by mixing the polymer emulsion into a tank of fresh water, followed by the addition of a salt, pH adjusting buffer, and an inverting surfactant. Preferably, an amount of treatment fluid sufficient to treat the entire height of the producing interval having a three-to-ten foot radius from the wellbore should be used.

With gentle mixing, the polymer inverts, yielding about 3–30 cps viscosity. The pH of the treatment fluid may then be adjusted with any Bronsted acid. The preferred pH is between 3.0 and 5.0. Preferred pH agents are those made as mixtures of acetic acid and sodium acetate and used at 1% to 3% volume of the treatment fluid. Once the treatment fluid is prepared and its pH adjusted to the desired level, the fluid is injected into the subterranean formation. In another embodiment, the treatment fluid may be prepared by continuous mix processes, wherein the fluid components are mixed together while the fluid is simultaneously injected into the wellbore.

The viscosity of the treatment fluid depends on the polymer emulsion concentration as well as the degree of swelling of the crosslinked polymer particles. Because the polymer has an anionic charge, the degree of swelling is strongly dependent on the salt concentration and pH of the solution. As the pH declines, the viscosity of the solution also declines. The effect of salt concentration and pH on the degree of swelling is demonstrated in Table 1.

TABLE 1

Swelling of Polymer Particles in Various Solvent Systems

| Solvent System | Concentration (% wt) for 5 cP viscosity | Volumetric Swelling Ratio | Polymer Particle Diameter |
| --- | --- | --- | --- |
| ISOPAR-L | 45% | — | 0.5–1 micron |
| deionized water | 0.5% | 90 | 4–5 times unswollen diameter |
| 2% KCl (pH 8–9) | 2.5% | 18 | 2.5 times unswollen diameter |
| 2% KCl (low pH) | 4% | 11 | 2.2 times unswollen diameter |

The viscosity of the treatment fluid can be varied by adjusting the salt concentration or pH. Generally, the pH is adjusted to 4 to minimize viscosity and enhance product placement in the subterranean formation or reservoir.

Typical injection rates for either batch or continuous mixed treatment fluid should be far below rates that would cause pressures to exceed those necessary to fracture the formation. During injection, the rates may be adjusted to insure that pressures are maintained below those necessary for fracturing.

Preferably, the well should be shut-in from about 6 to about 48 hours after injecting the treatment fluid to allow maximum polymer retention. Following the shut-in period, the well may then be placed back on production, with a noticeable drop in water production resulting over the next several days. In another embodiment, the methods of the present invention may be used to reduce water channeling through high permeable streaks in injector wells. The treatment proceeds as described above, except that the wells are not shut-in after injecting the treatment fluid. The polymer will be retained in the high permeable streaks ultimately improving the water sweep efficiency in the reservoir. The compositions and methods of the present invention may also have other applications where one desires to inhibit water flow.

One of the most favorable characteristics of the present invention is that the compositions and methods are selective because swelling only occurs in the water laden channels. A selective system is one that is relatively non-damaging to oil permeability in an oil saturated sandstone while decreasing water permeability in water saturated zones. This allows the system to be applied to a productive zone without mechanical isolation in the wellbore. Mechanical isolation of a water producing section or perforations can add a significant cost to a water control treatment. Consequently, a treatment that can be bull-headed down the existing completion tubulars will be considerably less expensive.

Bull-heading any matrix penetrating treatment from the surface can create concerns about satisfactory placement of that treatment in the matrix. Mechanical isolation is a very useful means of assuring good fluid placement in the desired portion of the subterranean formation zone. However, because of the selective nature of the present invention, mechanical isolation is unnecessary. The treatment fluid is a low viscosity, water based system and will preferentially invade the water bearing sections of the subterranean formation zone. To insure proper placement, other injection methods such as diversion are viable options. Internal diverting materials can be used to help place the treatment fluid or treatment system over the entire water producing interval. A suitable diverting agent is a portion of the treatment fluid itself, used without any pH adjustment. Negating the pH adjustment of higher treatment fluid loadings causes that portion of fluid to retain higher viscosities which ultimately enhances diversion. These diverting techniques are not viable when applying nonselective water control systems.

All polymeric water control systems have limitations with respect to the type of water control problem each can address. The chemical and physical nature of the present invention excludes it from being classified as a total or complete water shutoff system. Therefore, candidate well selection is extremely important for the successful application of this treatment system. This treatment system is applicable in sandstone formations where water is being produced through a permeable matrix. If the water is entering the wellbore due to an annular channel or a hole in the tubulars, the system of the present invention may have limited effectiveness. If the water influx is due to coning, then the treatment system of the present invention should be considered to be an effective and viable solution.

The treatment fluid or system induces an artificial pressure barrier and should be placed from the wellbore to an area beyond that influenced by the critical drawdown pressure responsible for the vertical water migration. The effectiveness of the compositions and methods of the present invention may be dependent on several factors, including the water saturation levels, horizontal to vertical permeability contrast, the amount of drawdown pressure, and the degree of depletion. Consequently, the invention should preferably be used as soon as a coning problem or potential coning problem is identified, rather than at the point when coning becomes intolerable.

The following Examples are intended to illustrate the present invention and in no way limit or restrict its scope.

EXAMPLE 1

In the present example, a method of preparing the "super absorber" polymer as an invert polymer emulsion is provided. The aqueous phase of the emulsion was prepared by adding 173.15 g of acrylamide, 35.13 g of acrylic acid and 0.264 g of methylene bisacrylamide to 125.40 g of deionized water. No monomer containing ammonium or quaternary ammonium moieties was used. The solution was neutralized by the slow addition of 77.82 g of 25% aqueous sodium hydroxide to pH 7.46. The hydrocarbon phase was prepared by adding 12.00 g ICI's HYPERMER® 2296 and 2.50 g of Rhone Poulenc's IGEPAL® CO-630 to 179.65 g Exxon's NORPAR® 12. The aqueous phase was slowly added to the hydrocarbon phase while homogenizing for four minutes at 24,000 rpm with a Janke Kunkel ULTRA TURRAX® homogenizer.

The emulsion was then cooled to 8° C. and degassed with $N_2$ while stirring in a resin kettle. The polymerization was initiated with 1 ml of 2% by weight cumene hydroperoxide in NORPAR® 12, and co-catalyzed with 5 drops of thionyl chloride in 10 ml of NORPAR® 12. The co-catalyst was slowly added throughout the polymerization. On addition of the first few drops of co-catalyst solution, the emulsion temperature began to increase. Within 30 seconds of addition, the temperature rose from 8° C. to 49° C. and after 5 minutes, peaked at 94° C. The emulsion then cooled to room temperature.

EXAMPLE 2

The polymerization in Example 1 was repeated except that the aqueous monomer phase was modified using the following monomer composition: 78.8 g acrylamide, 79.9 g acrylic acid, and 82.2 g of 60% aqueous dimethyldiallyl ammonium chloride all dissolved in 92.5 g of deionized water. In addition, 0.052 g of methylene bisacrylamide was added as the crosslinking monomer. The solution was neutralized to pH 7.92 by the slow addition of 88.49 g 50% aqueous NaOH. The hydrocarbon phase was prepared and mixed with the aqueous phase as described in Example 1. Polymerization was initiated with 1 ml of 2% by weight cumene hydroperoxide co-catalyzed with 5 drops of thionyl chloride in 10 ml of NORPAR® 12. The emulsion's polymerization exotherm reached 97° C. and was then cooled slowly to ambient temperature. The viscosity, measured on a FANN 35 viscometer, of a 2% by weight emulsion in deionized water was 15 cps at 511 $sec^{-1}$.

EXAMPLE 3

Permeability experiments for the emulsion prepared in Example 2 were performed using a 1" diameter, 12" length Berea sandstone core. Initially, the core was treated with 15% HCl as a standard procedure. The core was placed in a rubber sleeve, and was then subjected to a confining pressure in a cell at least 500 psi greater than the injection pressure, to prevent fluid leakage around the sides of the core. The cell temperature was set to 66° C. The fluid was injected along the axial direction, and the pressure drop across the length of the core and the flow rate were measured.

The permeability of the core was determined using a 5% NaCl, 1% $CaCl_2$ solution. The extent of permeability reduction was determined by comparing the permeability of the core before treatment with the permeability of the core after treatment. The treatment fluid consisted of a 0.5% by weight of the polymer emulsion of Example 2, 0.5% of a surfactant to invert the polymer emulsion, and 2% KCl solution as solvent. The pH of the solution was adjusted to 3.5 with hydrochloric acid. The permeability of the core during injection of the treatment fluid was also determined. After flowing or injecting the treatment fluid, the core was shut-in for 16 hours without any flow at temperature. After shut-in, the permeability of the core was determined using a 5% NaCl, 1% $CaCl_2$ solution. The permeability decreased from about 1000 md to about 250 md. This process of flowing or injecting the treatment fluid was repeated again with 1% by weight of the polymer emulsion and the cumulative effect of the product on the permeability studied. After the second injection, the permeability decreased to about 35 md. The sequence of steps and the permeability of the core at each step are shown in Table 2.

TABLE 2

PERMEABILITY REDUCTION TO WATER

| Step No. | Description of Fluid | Permeability (md) |
|---|---|---|
| 1 | 5% NaCl, 1% CaCl$_2$ solution | 903 |
| 2 | 0.5% Emulsion in 2% KCl solution Shut-in for 16 hours | 1260 |
| 3 | 5% NaCl, 1% CaCl$_2$ solution | 258 |
| 4 | 1% Emulsion in 2% KCl solution Shut-in for 16 hours | 305 |
| 5 | 5% NaCl, 1% CaCl$_2$ solution | 34 |

EXAMPLE 4

Another experiment was performed at 150° F. with a more permeable core using a concentration of 5% polymer emulsion in the treatment fluid. Also, the effect of salt concentration was studied. Initially, the core was treated with 15% HCl followed by 5% NaCl, 1% CaCl$_2$ solution. After determining the baseline permeability, the treatment fluid, consisting of 5% polymer emulsion and 0.5% inverting surfactant in 2% KCl solution with the pH adjusted to 3.5, was injected. After injection, the core was shut-in at temperature for about 16 hours. Afterward, the permeability to 5% NaCl, 1% CaCl$_2$ was re-determined. The permeability decreased from about 5000 md before injection to about 150–400 md after injection. After determining the permeability to 5% NaCl, 1% CaCl$_2$ solution, the brine concentration was increased to 10% NaCl and 5% CaCl$_2$. The permeability of the core remained between 150 and 300 md, indicating that the polymer is still effective at this higher brine concentration. The sequence of steps and the results are shown in Table 3.

TABLE 3

PERMEABILITY REDUCTION TO WATER

| Step No. | Description of Fluid | Permeability (md) |
|---|---|---|
| 1 | 5% NaCl, 1% CaCl$_2$ solution | 5500 |
| 2 | 5% Emulsion in 2% KCl solution Shut in for 16 hours | 550 |
| 3 | 5% NaCl, 1% CaCl2 | 150–450 |
| 4 | 10% NaCl, 5% CaCl2 | 175–325 |

EXAMPLE 5

Permeability experiments for the emulsion prepared in Example 2 were performed using a 1" diameter, 12" length Berea sandstone core. This was done to determine the effect of the treatment fluid in decreasing permeability to oil. Initially, the core was treated with 15% HCl as a standard procedure. The core was placed in a rubber sleeve and then, subjected to a confining pressure in a cell at least 500 psi greater than the injection pressure to prevent fluid leakage around the sides of the core. The cell temperature was set to 66° C., and the permeability of the core was determined using a 5% NaCl, 1% CaCl$_2$ solution. The fluid was injected along the axial direction, and the pressure drop across the length of the core and the flow rate were measured.

The permeability of the brine was determined. This was followed by 50/50 Amoco White/ISOPAR-L mixture. The viscosity of the oil mixture was 1.5 cP at test temperature or 3.5 times more viscous than the brine solution. The permeability of the core was determined using a 50/50 Amoco White Oil/ISOPAR-L blend and this corresponds to the permeability to oil with irreducible water present. The extent of permeability reduction was determined by comparing the permeability of the core to oil before treatment with the permeability of the core to oil after treatment. The treatment fluid consisted of a 1% by weight of the polymer emulsion shown in Example 2, 0.5% of a surfactant to invert the polymer emulsion, and 2% KCl solution as the solvent. The pH of the solution was adjusted to 3.5 with hydrochloric acid. The permeability of the treatment fluid was determined. After flowing the treatment fluid, the core was shut-in for 16 hours without any flow at temperature. Following the shut-in period, the permeability of the core was determined using 50/50 Amoco White Oil/ISOPAR-L solution. There was no significant change in the permeability to oil due to the product or treatment fluid. After determining the permeability to oil, a 5% NaCl, 1% CaCl$_2$ solution was injected and the permeability determined. The water permeability decreased from about 750 md before injection of the treatment fluid to about 200–350 md after injection. The sequence of steps and the permeability of the core at each step are shown in Table 4.

The results demonstrate that when the product is in contact with oil rich intervals in the reservoir, the product remains inert and does not impair hydrocarbon production.

TABLE 4

PERMEABILITY REDUCTION TO OIL

| Step No. | Description of Fluid | Permeability (md) |
|---|---|---|
| 1 | 5% NaCl, 1% CaCl$_2$ | 750 |
| 2 | 50/50 Amoco White/ISOPAR-L solution | 1484 |
| 3 | 1% Emulsion in 2% KCl solution Shut-in for 16 hours | 2100 |
| 4 | 50/50 Amoco White/ISOPAR-L solution | 1500 |
| 5 | 5% NaCl, 1% CaCl$_2$ | 200–350 |

EXAMPLE 6

A 5% by weight polymer solution was prepared by dissolving 18.95 g acrylamide, 19.2 g acrylic acid, and 19.75 g 60% by weight diallyldimethylammonium chloride in 900.0 g of deionized water. No crosslinking monomer was added. The acrylic acid was neutralized to pH 8.1 by the slow addition of 42.1 g of 25% by weight aqueous NaOH. The solution was cooled to 15° C. and degassed with N$_2$. Polymerization was initiated with the addition of 1 ml of 1.5% sodium persulfate solution co-catalyzed with 1 ml of 0.25% sodium sulfite solution. The solution was slowly warmed to ambient temperatures and eventually polymerized while heating to 49° C. A 0.5% wt active polymer solution made from this polymer solution had a viscosity of 25 cps at 511 sec$^{-1}$ on a FANN 35 viscometer.

EXAMPLE 7

Permeability experiments for the emulsion prepared in Example 6 were performed using a 1" diameter, 12" length Berea sandstone core. The core was placed in a rubber sleeve and then subjected to a confining pressure in a cell at least 500 psi greater than the injection pressure to prevent fluid leakage around the sides of the core. The cell temperature was set to 66° C. The fluid was injected along the axial direction, and the pressure drop across the length of the core and the flow rate were measured.

The permeability of the core was determined using a 5% NaCl, 1% CaCl₂ solution. The extent of permeability reduction was determined by comparing the permeability of the core before treatment with the permeability of the core after treatment. The water treatment solution consisted of 8% polymer and 2% KCl solution as solvent. The permeability of the water treatment solution was determined. After flowing the water treatment solution, the core was shut-in for 16 hours without any flow at temperature. After shut-in, the permeability of the core was determined using a 5% NaCl, 1% CaCl₂ solution. The sequence of steps and the permeability of the core at each step is shown in Table 5.

TABLE 5

PERMEABILITY REDUCTION TO WATER

| Step No. | Description of Fluid | Permeability (md) |
|---|---|---|
| 1 | 5% NaCl, 1% CaCl₂ | 890 |
| 2 | 8% Polymer in 2% KCl solution Shut-in for 16 hours | 1700 |
| 3 | 5% NaCl, 1% CaCl₂ solution | 707 |

The results of Table 5, when compared to those of Table 2, demonstrate that the permeability reduction was much more effective when a crosslinking monomer such as methylene bisacrylamide was used. In example 3 (table 2, composition of Example 2), crosslinking particles and a crosslinking monomer were used, resulting in a permeability reduction of 903 md to 34 md. In comparison, in this example (table 5, composition of Example 6), a hydrated polymer without a crosslinking monomer was used, and there was only a slight reduction in permeability of 890 md to 707 md.

Because no crosslinking monomer was used, the polymer was able to hydrate in the treating water. Because it is a hydratable polymer, the film it forms is considerably thinner than the crosslinked particles. Thus, while the thinner film also impairs permeability, it does so to a much lesser degree than when a crosslinking monomer is used, as in Example 2.

Those skilled in the art will recognize that, while specific embodiments have been illustrated and described, various modifications and changes may be made without departing from the spirit and scope of the invention.

What is claimed is:

1. A method for modifying the permeability of a subterranean formation, comprising the steps of:

mixing a vinylamide monomer of the formula:

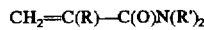

where R represents hydrogen, methyl, ethyl, or propyl moiety and R' represents hydrogen, methyl, ethyl or propyl moiety;

a monomer containing ammonium or quaternary ammonium moieties; and a crosslinking monomer;

to form a dispersion of water swellable crosslinked polymer particles, wherein said water swellable crosslinked polymer particles are of a size smaller in diameter than the pores of the subterranean formation;

adding an inverting surfactant to said dispersion of water swellable crosslinked polymer particles;

adding said dispersion of water swellable crosslinked polymer particles to a carrier fluid to form a treatment fluid; and injecting said treatment fluid into at least a portion of said subterranean formation.

2. The method of claim 1, further comprising the step of shutting-in the well for a period of 6 to 48 hours following said injecting of said treatment fluid, to allow maximum polymer retention.

3. The method of claim 1, wherein said water swellable crosslinked polymer particles are formed by invert emulsion polymerization.

4. The method of claim 1, wherein said dispersion of water swellable crosslinked polymer particles comprises 0.08 to 15.0% weight polymer.

5. The method of claim 1, wherein said dispersion of water swellable crosslinked polymer particles comprises 0.1 to 1.5% weight polymer.

6. The method of claim 1, wherein said dispersion of water swellable crosslinked polymer particles comprises up to 5 parts of said vinylamide monomer.

7. The method of claim 1, wherein said dispersion of water swellable crosslinked polymer particles comprises 0.5 to 5 parts of said monomer containing ammonium or quaternary ammonium moieties.

8. The method of claim 1, wherein said dispersion of water swellable crosslinked polymer particles comprises 50–1000 ppm of said crosslinking monomer.

9. The method of claim 1, wherein said mixing step further comprises a monomer having the formula:

where X represents a moiety containing a carboxylic acid or salt of that acid or a moiety containing a sulfuric acid or salt of that acid.

10. The method of claim 9, wherein said monomer having the formula:

where X represents a moiety containing a carboxylic acid or salt of that acid or a moiety containing a sulfuric acid or salt of that acid, comprises up to 5 parts of said dispersion of water swellable crosslinked polymer particles.

* * * * *